(12) United States Patent
Yoshida et al.

(10) Patent No.: US 9,552,839 B2
(45) Date of Patent: Jan. 24, 2017

(54) OPTICAL RECORDING MEDIUM AND MANUFACTURING METHOD OF THE SAME

(71) Applicant: Sony Corporation, Tokyo (JP)

(72) Inventors: Takeshi Yoshida, Miyagi (JP); Minoru Kikuchi, Miyagi (JP); Akio Koshita, Miyagi (JP)

(73) Assignee: Sony Corporation, Tokyo (JP)

( * ) Notice: Subject to any disclaimer, the term of this patent is extended or adjusted under 35 U.S.C. 154(b) by 22 days.

(21) Appl. No.: 14/666,739

(22) Filed: Mar. 24, 2015

(65) Prior Publication Data

US 2015/0279411 A1 Oct. 1, 2015

(30) Foreign Application Priority Data

Mar. 31, 2014 (JP) ................................. 2014-074952

(51) Int. Cl.

| G11B 7/24 | (2013.01) |
|---|---|
| G11B 7/24024 | (2013.01) |
| B32B 3/26 | (2006.01) |
| B32B 7/04 | (2006.01) |
| G11B 7/24047 | (2013.01) |
| G11B 7/26 | (2006.01) |
| B32B 7/12 | (2006.01) |
| B32B 27/08 | (2006.01) |
| B32B 27/16 | (2006.01) |
| B32B 27/32 | (2006.01) |

(Continued)

(52) U.S. Cl.
CPC ........... *G11B 7/24024* (2013.01); *B32B 3/266* (2013.01); *B32B 7/04* (2013.01); *B32B 7/12* (2013.01); *B32B 27/08* (2013.01); *B32B 27/16* (2013.01); *B32B 27/32* (2013.01); *B32B 27/365* (2013.01); *G11B 7/24047* (2013.01); *G11B 7/26* (2013.01); *B32B 2307/204* (2013.01); *B32B 2307/40* (2013.01); *B32B 2307/7242* (2013.01); *B32B 2429/02* (2013.01); *G11B 7/24027* (2013.01); *G11B 7/24038* (2013.01); *G11B 7/256* (2013.01); *G11B 7/266* (2013.01); *G11B 2007/240004* (2013.01)

(58) Field of Classification Search
CPC ..... G11B 7/256; G11B 7/266; G11B 7/24018; G11B 7/24038; G11B 7/24024; G11B 7/24027; Y10T 428/21; B32B 7/12; B32B 27/00; B32B 2307/40
See application file for complete search history.

(56) References Cited

U.S. PATENT DOCUMENTS

| 2007/0281123 A1* | 12/2007 | Umezawa | G11B 7/246 428/64.4 |
|---|---|---|---|
| 2009/0196141 A1* | 8/2009 | Mikoshiba | G11B 7/0045 369/100 |
| 2012/0094054 A1* | 4/2012 | Town | G11B 7/24038 428/65.1 |

FOREIGN PATENT DOCUMENTS

JP 2003-99985 4/2003

\* cited by examiner

*Primary Examiner* — Elizabeth Mulvaney
(74) *Attorney, Agent, or Firm* — K&L Gates LLP

(57) ABSTRACT

Provided is an optical recording medium including: two discs, each of which includes a substrate and a plurality of recording layers; and an attachment layer which is provided between the two discs and includes ultraviolet curable resin, wherein thickness of each of the substrates in the two discs is equal to or greater than 0.3 mm and equal to or less than 0.545 mm, wherein transmittance of the two discs is equal to or less than 20%, and wherein inversion rates on both (Continued)

surface sides of the attachment layer are equal or substantially equal to each other, and are equal to or greater than 70%.

12 Claims, 8 Drawing Sheets

(51) Int. Cl.
    *B32B 27/36*         (2006.01)
    *G11B 7/24027*    (2013.01)
    *G11B 7/24038*    (2013.01)
    *G11B 7/256*       (2006.01)

OPTICAL RECORDING MEDIUM AND MANUFACTURING METHOD OF THE SAME

CROSS REFERENCES TO RELATED APPLICATIONS

The present application claims priority to Japanese Priority Patent Application JP 2014-074952 filed in the Japan Patent Office on Mar. 31, 2014, the entire content of which is hereby incorporated by reference.

BACKGROUND

The present disclosure relates to an optical recording medium provided with two substrates and a manufacturing method of the same.

As an optical recording medium, an attachment-type optical recording medium such as a digital versatile disc (DVD) has widely been used. The optical recording medium is manufactured by laminating two substrates via ultraviolet curable resin, curing the ultraviolet curable resin, and attaching the two substrates to each other.

In relation to the attachment-type optical recording medium, a technique for suppressing occurrence of warpage of the medium has been studies. For example, Japanese Unexamined Patent Application Publication 2003-99985 discloses manufacturing of a flat attachment-type substrate by holding two thin substrates by a substrate holding unit with an ultraviolet curable adhesive interposed therebetween, adsorbing and holding the thin substrates by a holding table provided at the holding unit, and correcting warpage and deformation occurring in the thin substrates.

SUMMARY

It is desirable to provide an optical recording medium capable of suppressing occurrence warpage and a manufacturing method of the same.

According to an embodiment of the present disclosure, there is provided an optical recording medium including: two discs, each of which includes a substrate and a plurality of recording layers; and an attachment layer which is provided between the two discs and includes ultraviolet curable resin, wherein thickness of each of the substrates in the two discs is equal to or greater than 0.3 mm and equal to or less than 0.545 mm, wherein transmittance of the two discs is equal to or less than 20%, and wherein inversion rates on both surface sides of the attachment layer are equal or substantially equal to each other, and are equal to or greater than 70%.

According to another embodiment of the present disclosure, there is provided a manufacturing method of an optical recording medium including: irradiating, with ultraviolet light, an ultraviolet curable resin layer interposed between two discs from both sides of the two discs, each of which includes a substrate and a plurality of recording layers, and curing the ultraviolet curable resin such that inversion rates on both surface sides of the ultraviolet curable resin layer becomes equal or substantially equal to each other and become equal to or greater than 70%, wherein a thickness of each of the substrates in the two discs is equal to or greater than 0.3 mm and equal to or less than 0.545 mm, and wherein transmittance of the two discs is equal to or less than 20%.

According to the present disclosure, it is possible to suppress occurrence of warpage of the optical recording medium as described above.

Additional features and advantages are described herein, and will be apparent from the following Detailed Description and the figures.

DETAILED DESCRIPTION

Recording layers included in each disc are recording layers dedicated for reproduction (so-called reproduction layers), recordable recording layers, or rewritable recording layers. Although the number of recording layers included in two discs to be attached to each other is preferably two or more in terms of recording capacity, the number may also be one. In a case in which the discs include a plurality of recording layers, a spacer layer is preferably provided between the recording layers. One or more recording layers are provided on a substrate, and a cover layer is preferably provided on the recording layers. Although the thickness of the cover layer is not particularly limited, it is preferable to employ a thin light transmitting layer, such as a sheet or a coating layer, as the cover layer and to record or reproduce an information signal by irradiating the optical recording medium from the side of the light transmitting layer with light since an object lens with high NA is used in a high-density optical recording medium.

From a viewpoint of improving storage reliability, it is further preferable to provide a dielectric layer on at least one surface of each recording layer, and it is more preferable to provide dielectric layers on both surfaces of each recording layer. From a viewpoint of simplifying a layer structure and fabrication facility, it is preferable to use the recording layers alone without providing the dielectric layers on any surfaces of the recording layer.

Embodiments of the present disclosure will be described in the following order.

Figure 1A:
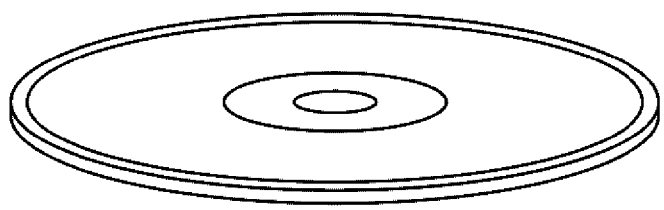
FIG. 1A is a perspective view illustrating an example of an appearance of an optical recording medium according to a first embodiment of the present disclosure.

1. First Embodiment (Example of Optical Recording Medium)
  1.1 Configuration of Optical Recording Medium
  1.2 Manufacturing Method of Optical Recording Medium
  1.3 Effects
  1.4 Modification Example
2. Second Embodiment (Examples of Optical Recording Medium and Spin Coating Apparatus)
  2.1 Outline
  2.2 Configuration of Optical Recording Medium
  2.3 Configuration of Spin Coating Apparatus 1. First Embodiment 1.1 Configuration of Optical Recording Medium As shown in FIG. 1A, an optical recording medium 1 according to an embodiment of the present disclosure has a disc shape with an opening (hereinafter, referred to as a "center hole") provided at the center thereof. In addition, the shape of the optical recording medium 1 is not limited to this example, and the optical recording medium 1 can also have a card shape.

Figure 1B:
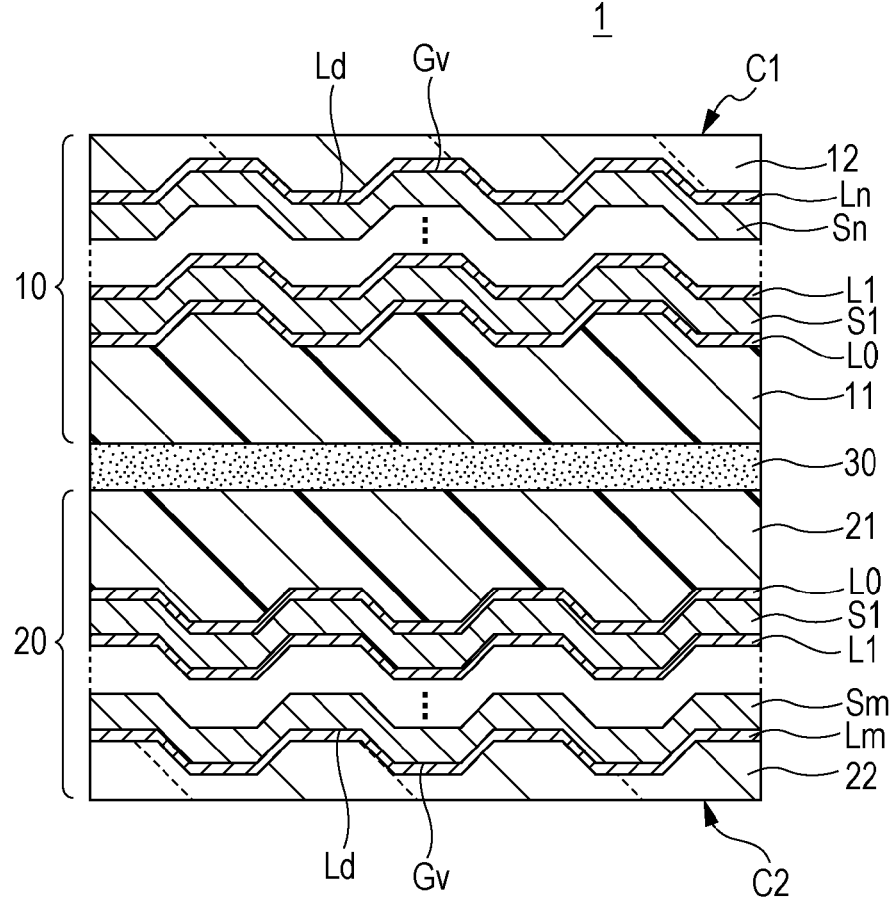
FIG. 1B is an outline cross-sectional view illustrating an example of a configuration of the optical recording medium according to the first embodiment of the present disclosure.

As shown in FIG. 1B, the optical recording medium 1 is a so-called multilayered recordable optical recording medium and is provided with a first disc 10, a second disc 20, and an attachment layer 30 provided between the first disc 10 and the second disc 20.

The first disc 10 has a configuration in which an information signal layer L0, a spacer layer S1, an information signal layer 11, . . . , a spacer layer Sn, an information signal layer Ln, a light transmitting layer 12 as a cover layer are laminated in this order on a main surface of a substrate 11. The second disc 20 has a configuration in which an information signal layer L0, a spacer layer S1, an information signal layer L1, . . . , a spacer layer Sm, an information signal layer Lm, and a light transmitting layer 22 as a cover layer are laminated in this order on a main surface of a substrate 21. Here, n and m are integer which is one, two or more, and may be different values. In the following description, the information signal layers L0 to Ln and L0 to Lm will be collectively referred to as information signal layers L when the information signal layers L0 to Ln and L0 to Lm are not particularly distinguished from each other.

The optical recording medium 1 includes light irradiation surfaces which are provided on both surfaces thereof and are irradiated with light for recording or reproducing an information signal. More specifically, the optical recording medium 1 includes a first light irradiation surface C1 which is irradiated with laser light for recording or reproducing an information signal for the first disc 10 and a second light irradiation surface C2 which is irradiated with laser light for recording or reproducing an information signal for the second disc 20.

In the first disc 10, the information signal layer L0 is located at the furthest position on the basis of the position of the first light irradiation surface C1, and the information signal layers L1 to Ln are located in front of the information signal layer L0. For this reason, the information signal layers L1 to Ln are configured to be able to transmit laser light which is used for recording or reproduction. In contrast, in the second disc 20, the information signal layer L0 is located at the furthest position on the basis of the position of the second light irradiation surface C2, and the information signal layers L1 to Lm are located in front of the information signal layer L0. For this reason, the information signal layers L1 to Lm are configured to be able to transmit laser light which is used for recording or reproduction.

The optical recording medium 1 records or reproduces the information signal for the first disc 10 as follows. That is, the information signal is recorded in or reproduced from the first disc 10 by irradiating the respective information signal layers L0 to Ln included in the first disc 10 with the laser light from the first light irradiation surface C1 on the side of the light transmitting layer 12. For example, the information signal is recorded or reproduced collecting laser light with a wavelength within a range of equal to or greater than 350 nm and equal to or less than 410 nm by an object lens with numerical apertures in a range of equal to or greater than 0.84 and equal to or less than 0.86 and irradiating the respective information signal layers L0 to Ln included in the first disc 10 with the collected laser light form the side of the light transmitting layer 12.

In contrast, the information signal is recorded in or reproduced from the second disc 20 as follows. That is, the information signal is recorded in and reproduced from the second disc 20 by irradiating the respective information signal layers L0 to Lm included in the second disc 20 with the laser light from the surface C on the side of the light transmitting layer 22. For example, the information signal is recorded or reproduced by collecting laser light with a wavelength within a range of equal to or greater than 350 nm and equal to or less than 410 nm by an object lens with numerical aperture within a range of equal to or greater than 0.84 and equal to or less than 0.86 and irradiating the respective information signal layers L0 to Lm included in the second disc 20 with the collected laser light from the side of the light transmitting layer 22.

Transmittance of the first disc 10 and the second disc 20 is independently equal to or less than 20%, for example, and is preferably equal to or greater than 5% and equal to or less than 20%. The thickness of each of the first disc 10 and the second disc 20 is 0.6 mm, for example. The outer diameter (diameter) of each of the first disc 10 and the second disc 20 is 120 mm, for example. The inner diameter (diameter) of each of the first disc 10 and the second disc 20 is 15 mm, for example.

Hereinafter, a description will be given of the substrates 11 and 21, the attachment layer 30, the information signal layers L0 to Ln and L0 to Lm, the spacer layers S1 to Sn and S1 to Sm, and the light transmitting layers 12 and 22 which configure the optical recording medium 1 in turn.

Substrates

Each of the substrates 11 and 21 has a disc shape with a center hole provided at the center thereof, for example. A main surface of each of the substrates 11 and 21 is an uneven surface, for example, and an information signal layer L0 is formed on the uneven surface. Hereinafter, concave portion of the uneven surface will be referred to as a land Ld, and a convex portion thereof will be referred to as a groove Gv.

As the shape of the land Ld and the groove Gv, various shapes such as a spiral shape and a concentric circle can be exemplified. In addition, the land LD and/or the groove Gv may wobble in order to stabilize a linear speed or add address information, for example.

As an outer diameter (diameter) of each of the substrates 11 and 21, 120 mm is selected, for example. As an inner diameter (diameter) of each of the substrates 11 and 21, 15 mm is selected, for example. The thickness of the substrate 11 is selected in consideration of rigidity, is preferably equal to or greater than 0.3 mm and equal to or less than 0.545 mm, and is more preferably equal to or greater than 0.445 mm and equal to or less than 0.545 mm.

As a material of the substrate 11, it is preferable to use plastic resin in terms of costs. As the plastic resin, it is possible to use polycarbonate resin, polyolefin resin, or acrylic resin, for example.

Attachment Layer

The attachment layer 30 contains cured ultraviolet curable resin. By the attachment layer 30, the first disc 10 and the second disc 20 are attached to each other. More specifically, the substrate 11 in the first disc 10 and the substrate 21 in the second disc 20 are attached to each other such that the light transmitting layers 10 and 21 are respectively located on surface sides.

Inversion rates of the ultraviolet curable resin in both surfaces of the attachment layer 30 are equal or substantially equal to each other and are equal to or greater than 70%.

The thickness of the attachment layer 30 is equal to or greater than 0.01 mm and equal to or less than 0.22 mm, for example. The ultraviolet curable resin is radical polymerization-type ultraviolet curable resin.

Information Signal Layers

Figure 2:
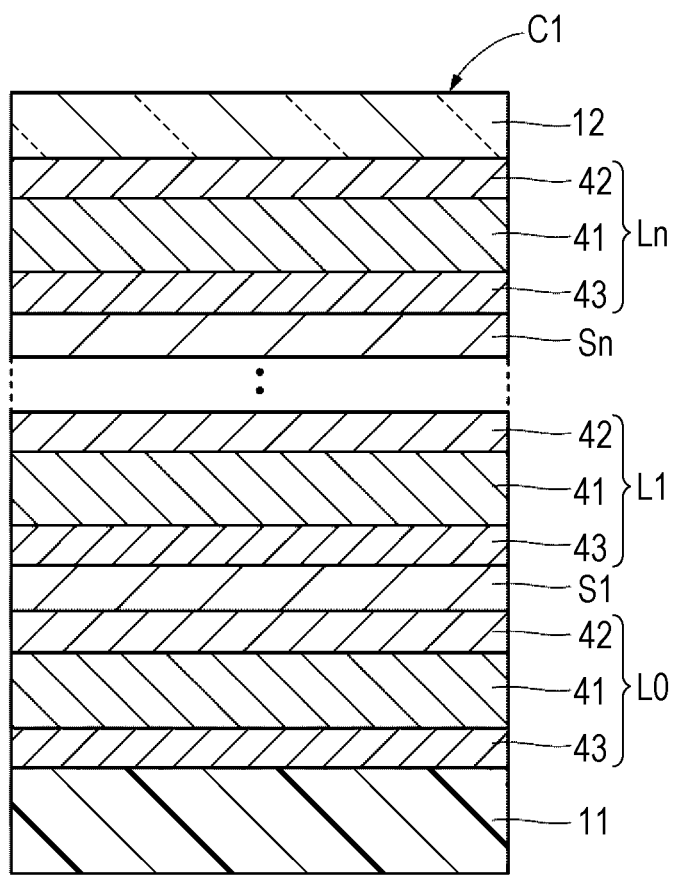
FIG. 2 is a diagram schematically illustrating an example of configurations of the respective information signal layers.

As shown in FIG. 2, each of the information signal layers L0 to Ln is provided with a recording layer 41 including an upper surface (first main surface) and a lower surface (second main surface), a dielectric layer 42 provided so as to be adjacent to the upper surface of the recording layer 41, and a dielectric layer 43 provided so as to be adjacent to the lower surface of the recording layer 41. With such a configuration, it is possible to improve storage reliability of the information signal layers L0 to Ln. Here, the upper surface corresponds to a main surface of the recording layer 41 on the side on which the recording layer 41 is irradiated with the laser light for recording or reproducing the information signal. The lower surface corresponds to the other main surface on the side opposite to the aforementioned side, on which the recording layer 41 is irradiated with the laser light, namely the main surface on the side of the substrate 11. Since the configurations of the information signal layers L0 to Lm can be the same as those of the information signal layers L0 to Ln, descriptions thereof will be omitted.

Recording Layer

Each recording layer 41 contains, as a main constituent, a ternary compound system oxidation product of a w oxidation product, a Pd oxidation product, and a Cu oxidation product, for example. A rate of W, Pd, and Cu contained the ternary compound system oxidation product preferably satisfies a relationship of $0.17 \leq x_1$, more preferably satisfies a relationship of $0.37 \leq x_1$, further preferably satisfies a relationship of $0.37 \leq x_1 \leq 1.26$, the most preferably satisfies a relationship of $0.56 \leq x_1 \leq 1.26$. With such a configuration, it is possible to satisfy properties necessary for the information signal layers L in the optical recording medium 1 and to realize an excellent light transmitting property. Here, as the properties necessary for the information signal layers L in the optical recording medium 1, a satisfactory signal property, a high recording power margin, high reproduction durability, suppression of variations in transmittance after recording, and the like are exemplified.

Here, $x_1$ is a variable defined as $x_1 = a/(b + 0.8c)$.

a: atomic ratio [at %] of W with respect to the sum of W, Pd, and Cu b: atomic ratio [at %] of Pd with respect to the sum of W, Pd, AND Cu c: atomic ratio [at %] of Cu with respect to the sum of W, Pd, and Cu From the viewpoint of increasing the intensity of light which reaches the information signal layer L0 located at the furthest position from the first light irradiation surface C1, it is preferable that all the recording layers 41 in the information signal layers L1 to Ln other than the information signal layer L0 contain the aforementioned ternary compound system oxidation product as a main constituent. In such a case, the rate of W, Pd, and Cu contained in the aforementioned ternary compound system preferably satisfies the relationship of $0.17 \leq x_1$, more preferably satisfies a relationship of $0.37 \leq x_1$, further preferably satisfies a relationship of $0.37 \leq x_1 \leq 1.26$, the most preferably satisfies a relationship of $0.56 \leq x_1 \leq 1.26$. In addition, it is typically necessary for the information signal layer L which is located closer to the furthest layer to have higher recording sensitivity, and therefore, transmittance tends to be lower. For this reason, design is made such that the information signal layer L which is located closer to the first light irradiation surface C1 has higher transmittance, in many cases. Accordingly, a value of the variable $x_1$ of the recording layer 41 in each of the information signal layers L1 to Ln preferably becomes larger for the information signal layer L located closer to the first light irradiation surface C1.

From the viewpoint of a satisfactory signal property, a high recording power margin, high reproduction durability, and suppression of variations in transmittance after recording, all the recording layers 41 included in the information signal layers L0 to Ln preferably contain the aforementioned ternary compound system oxidation product as a main constituent. In such a case, the rate of W, Pd, and Cu contained in the aforementioned ternary compound system preferably satisfies the relationship of $0.17 \leq x_1$, more preferably satisfies a relationship of $0.37 \leq x_1$, further preferably satisfies a relationship of $0.37 \leq x_1 \leq 1.26$, the most preferably satisfies a relationship of $0.56 \leq x_1 \leq 1.26$. In addition, it is preferable that the value of the variable $X_1$ of the recording layer 41 in each of the information signal layers L0 to L4 becomes larger for the information signal layer L located closer the first light irradiation surface C1. This is because it is possible to set higher transmittance to the information signal layer L which is located closer to the first light irradiation surface C1.

An atomic ratio a of W with respect to the sum of W, Pd, and Cu is preferably within a range of equal to or greater than 10 at % and equal to or less than 70 at % and is more preferably within a range of equal to or greater than 14.2 at % and equal to or less than 31.8 at %. If the atomic ratio a is less than 10 at %, there is a tendency that the transmittance becomes low. In contrast, if the atomic ratio exceeds 70 at %, there is a tendency that recording sensitivity becomes low.

An atomic ratio b of Pd with respect to the sum of W, Pd, and Cu is preferably within a range of equal to or greater than 2 at % and equal to or less than 50 at % and is more preferably within a range of equal to or greater than 4.4 at % and equal to or less than 32.2 at %. If the atomic ratio b is less than 2 at %, there is a tendency that the recording power margin becomes narrow. In contrast, if the atomic ratio b exceeds 50 at %, there is a tendency that the transmittance becomes low.

An atomic ratio c of Cu with respect to the sum of W, Pd, and Cu is preferably within a range of equal to or greater than 10 at % and equal to or less than 70 at % and is more preferably within a range of equal to or greater than 28.5 at % and equal to or less than 68.1 at %. If the atomic ratio c is less than 10 at %, there is a tendency that the reproduction durability deteriorates. In contrast, if the atomic ratio c exceeds 70 at %, there is a tendency that the transmittance becomes low.

At least one of the recording layers 41 in the information signal layers L1 to Ln other than the information signal layer L0 which is located at the furthest location from the first light irradiation surface C1 preferably contains, as a main constituent, a quaternary compound system oxidation product which is obtained by further adding a Zn oxidation product to the aforementioned ternary compound system oxidation product. A rate of W, Pd, Cu, and Zn contained on the quaternary compound system oxidation product preferably satisfies a relationship of $0.17 \leq x_2$, more preferably satisfies a relationship of $0.37 \leq x_2$, further preferably satisfies a relationship of $0.37 \leq x_2 \leq 1.26$, the most preferably satisfies a relationship of $0.56 \leq x_2 \leq 1.26$. By adding the Zn oxidation product, it is possible to satisfy the properties necessary for the information signal layer in the optical recording medium 1, to maintain a satisfactory transmission property, and to reduce the total amount other than the Zn oxidation product. That is, it is possible to reduce the rate of the expensive Pd oxidation product by adding the Zn oxidation product and to thereby realize a decrease in costs.

Here, $x_2$ is a variable defined as $x_2=(0.1d+a)/(b+0.8c)$.

a: atomic ratio [at %] of W with respect to the sum of W, Pd, Cu, and Zn b: atomic ratio [at %] of Pd with respect to the sum of W, Pd, Cu, and Zn c: atomic ratio [at %] of Cu with respect to the sum of W, Pd, Cu, and Zn d: atomic ratio [at %] of Zn with respect to the sum of W, Pd, Cu, and Zn From the viewpoint of increasing the intensity of light which reaches the information signal layer L0 located at the furthest position from the first light irradiation surface C1, it is preferable that all the recording layers 41 in the information signal layers L1 to Ln other than the information signal layer L0 contain the aforementioned quaternary compound system oxidation product as a main constituent. In such a case, the rate of W, Pd, and Cu contained in the aforementioned quaternary compound system preferably satisfies the relationship of $0.17 \leq x_2$, more preferably satisfies a relationship of $0.37 \leq x_2$, further preferably satisfies a relationship of $0.37 \leq x_2 \leq 1.26$, the most preferably satisfies a relationship of $0.56 \leq x_2 \leq 1.26$. In addition, it is preferable that the value of the variable $X_2$ of the recording layer 41 in each of the information signal layers L1 to Ln becomes larger for the information signal layer L located closer to the first light irradiation surface C1. This is because it is possible to set higher transmittance to the information signal layer L which is located closer to the first light irradiation surface C1.

From the viewpoint of a satisfactory signal property, a high recording power margin, high reproduction durability, suppression of variations in transmittance after recording, and a decrease in costs, all the recording layers 41 included in the information signal layers L0 to Ln preferably contain the aforementioned quaternary compound system oxidation product as a main constituent. In such a case, the rate of W, Pd, and Cu contained in the aforementioned quaternary compound system preferably satisfies the relationship of $0.17 \leq x_2$, more preferably satisfies a relationship of $0.37 \leq x_2$, further preferably satisfies a relationship of $0.37 \leq x_2 \leq 1.26$, the most preferably satisfies a relationship of $0.56 \leq x_2 \leq 1.26$. In addition, it is typically necessary for the information signal layer L which is located closer to the furthest layer to have higher recording sensitivity, and therefore, transmittance tends to be lower. For this reason, design is made such that the information signal layer L which is located closer to the first light irradiation surface C1 has higher transmittance, in many cases. Accordingly, a value of the variable $x_2$ of the recording layer 41 in each of the information signal layers L1 to Ln preferably becomes larger for the information signal layer L located closer to the first light irradiation surface C1.

An atomic ratio a of W with respect to the sum of W, Pd, Cu, and Zn is preferably within a range of equal to or greater than 10 at % and equal to or less than 70 at % and is more preferably within a range of equal to or greater than 14.2 at % and equal to or less than 31.8 at %. If the atomic ratio a is less than 10 at %, there is a tendency that the transmittance becomes low. In contrast, if the atomic ratio a exceeds 70 at %, there is a tendency that the recording sensitivity becomes low.

An atomic ratio b of Pd with respect to the sum of W, Pd, Cu, and Zn is preferably within a range of equal to or greater than 2 at % and equal to or less than 50 at % and is more preferably within a range of equal to or greater than 4.4 at % and equal to or less than 32.2 at %. If the atomic ratio b is less than 2 at %, there is a tendency that the recording power margin becomes narrow. In contrast, if the atomic ratio b exceeds 50 at %, there is a tendency that the transmittance becomes low.

An atomic ratio c of Cu with respect to the sum of W, Pd, Cu, and Zn is preferably within a range of equal to or greater than 10 at % and equal to or less than 70 at % and is more preferably within a range of equal to or greater than 28.5 at % and equal to or less than 43.4 at %. If the atomic ratio c is less than 10 at %, there is a tendency that the reproduction durability deteriorates. In contrast, if the atomic ratio c exceeds 70 at %, there is a tendency that the transmittance becomes low.

An atomic ratio d of Zn with respect to the sum of W, Pd, Cu, and Zn is preferably within a range of equal to or greater than 5 at % and equal to or less than 60 at % and is more preferably within a range of equal to or greater than 17 at % and equal to or less than 41 at %. If the atomic ratio d is less than 5 at %, there is a tendency that the cost reduction effect becomes low. In contrast, if the atomic ratio d exceeds 60 at %, there is a tendency that durability in a high-temperature high-moisture environment deteriorates.

As a material of the information signal layers L1 to Ln other than the aforementioned ternary compound system oxidation product or the quaternary compound system oxidation product, it is also possible to use a mixture of an In oxidation product and a Pd oxidation product, for example. However, variations in properties before and after recording increase due to a large amount of bubbles generated when a recording mark is formed, and small variations in transmittance after the recording, which is one of the necessary properties, are not achieved though it is possible to realize an excellent transmittance property of the information signal layers L in the optical recording medium 1. For this reason, it is preferable to use the aforementioned ternary compound system oxidation product or the quaternary compound system oxidation product.

As a material of the information signal layer L0 located at the furthest position from the first light irradiation surface C1, it is also possible to use a mixture of an In oxidation product and a Pd oxidation product. However, it is preferable to use the aforementioned ternary compound system oxidation product or the quaternary compound system oxidation product from the viewpoint of the recording power margin property.

The thickness of each recording layer 41 is preferably within a range of equal to or greater than 25 nm and equal to or less than 60 nm and is more preferably within a range of equal to or greater than 30 nm and equal to or less than 50 nm. If the thickness is less than 25 nm, there is a tendency that the signal property deteriorates. In contrast, if the thickness exceeds 60 nm, there is a tendency that the recording power margin becomes narrow.

Dielectric Layers

By causing the dielectric layers 42 and 43 to function as gas barrier layers, it is possible to improve durability of the recording layers 41. In addition, it is possible to suppress variations in film quality of the recording layers 41 (detect mainly as a decrease in reflectance) and to secure necessary film quality for the recording layers 41 by suppressing escaping of oxygen from the recording layers 41 and suppressing entrance of $H_2O$.

As materials of the dielectric layers 42 and 43, at least one kind selected from a group consisting of oxide, nitride, sulfide, carbide, and fluoride, for example. As materials of the dielectric layers 42 and 43, the same material or different materials may be used. Examples of oxide include oxide of one or more elements selected from a group consisting In, Zn, Sn, Al, Si, Ge, Ti, Ga, Ta, Nb, Hf, Zr, Cr, Bi, and Mg. Examples of nitride include nitride of one or more elements selected from a group consisting of In, Sn, Ge, Cr, Si, Al, Nb, Mo, Ti, Nb, Mo, Ti, W, Ta, and Zn, and preferable examples include nitride of one or more elements selected from a group consisting of Si, Ge, and Ti. Examples of sulfide include Zinc sulfide. Examples of carbide include carbide of one or more elements selected from a group consisting of In, Sn, Ge, Cr, Si, Al, Ti, Zr, Ta, and W, and preferable examples include carbide of one or more elements selected from a group consisting of Si, Ti, and W. Examples of fluorine include fluorine of one or more element selected from a group consisting of Si, Al, Mg, Ca, and La. Examples of the mixtures thereof include $ZnS\text{—}SiO_2$, $SiO_2\text{—}In_2O_3\text{—}ZrO_2$ (SIZ), $SiO_2\text{—}Cr_2O_3\text{—}ZrO_2$ (SCZ), $In_2O_3\text{—}SnO_2$ (ITO), $In_2O_3\text{—}CeO_2$(ICO), $In_2O_3\text{—}Ga_2O_3$ (IGO), $In_2O_3\text{—}Ga_2O_3\text{—}ZnO$(IGZO), $Sn_2O_3\text{—}Ta_2O_5$(TTO), $TiO_2\text{—}SiO_2$, $Al_2O_3\text{—}ZnO$, $Al_2O_3\text{—}BaO$.

Spacer Layers

The spacer layers S1 to Sn and S1 to Sm respectively play a role in physically and optically separating the information signal layers L0 to Ln and L0 to Lm with a sufficient distance, and uneven surfaces are provided thereon. On each of the uneven surfaces, concentric or spiral land Ld and groove Gv are formed. Thickness of each of the spacer layers S1 to Sn and S1 to Sm is preferably set from 9μ to 50 μm. Although a material of the spacer layers S1 to Sn is not particularly limited, it is preferable to use ultraviolet curable acrylic resin. Since the spacer layers S1 to Sn and S1 to Sm function as optical paths of laser light for recording or reproducing the information signal in or from the layer on the furthest side, the spacer layers S1 to Sn and S1 to Sm preferably have sufficiently high light transmitting property.

Light Transmitting Layer

The light transmitting layers 12 and 22 have resin layers which are obtained by curing photosensitive resin such as ultraviolet resin. Examples of a material of the resin layer include ultraviolet curable acrylic resin. In addition, each of the light transmitting layers 12 and 22 may be configured of a light transmitting sheet with a ring shape and an adhesive layer for attaching the light transmitting sheet to each of the substrates 11 and 21. The light transmitting sheet is preferably made of a material which exhibits a low absorbing ability with respect to the laser light used for the recording and the reproduction, and specifically, the light transmitting sheet is preferably made of a material with transmittance of equal to or greater than 90%. As a material of the light transmitting sheet, it is possible to use a polycarbonate resin material, a polyolefin resin (Zeonex (registered trademark), for example), or the like. As a material of the adhesive layer, it is possible to use an ultraviolet curable resin, a pressure sensitive adhesive (PSA), or the like.

The thickness of each of the light transmitting layers 12 and 22 is preferably selected within a range of equal to or greater than 10 μm and equal to or less than 177 μm, and for example, is selected to be 100 μm, for example. By combining such a thin light transmitting layer 12 and an object lens with high numerical apertures (NA) of about 0.85, for example, it is possible to realize high-density recording.

Hard Coating Layers

Although not shown in the drawing, hard coating layers for protecting the recording and reproducing quality of the information signal from mechanical impact, scratching, adhesion of dust or fingerprints when a user handles the optical recording medium 1, and the like may be further provided on the surfaces (the first light irradiation surface C1 and the second light irradiation surface C2) of the light transmitting layers 12 and 22. As the hard coating layers, it is possible to use ultraviolet curable resin obtained by mixing silica gel fine powder in order to improve mechanical strength, solvent-type ultraviolet curable resin, solventless ultraviolet curable resin, or the like. In order to provide mechanical strength, a water repellency, and oil repellency, the thickness thereof is preferably set from 1 μm to several μm.

Configuration of Spin Coating Apparatus

Figure 3:
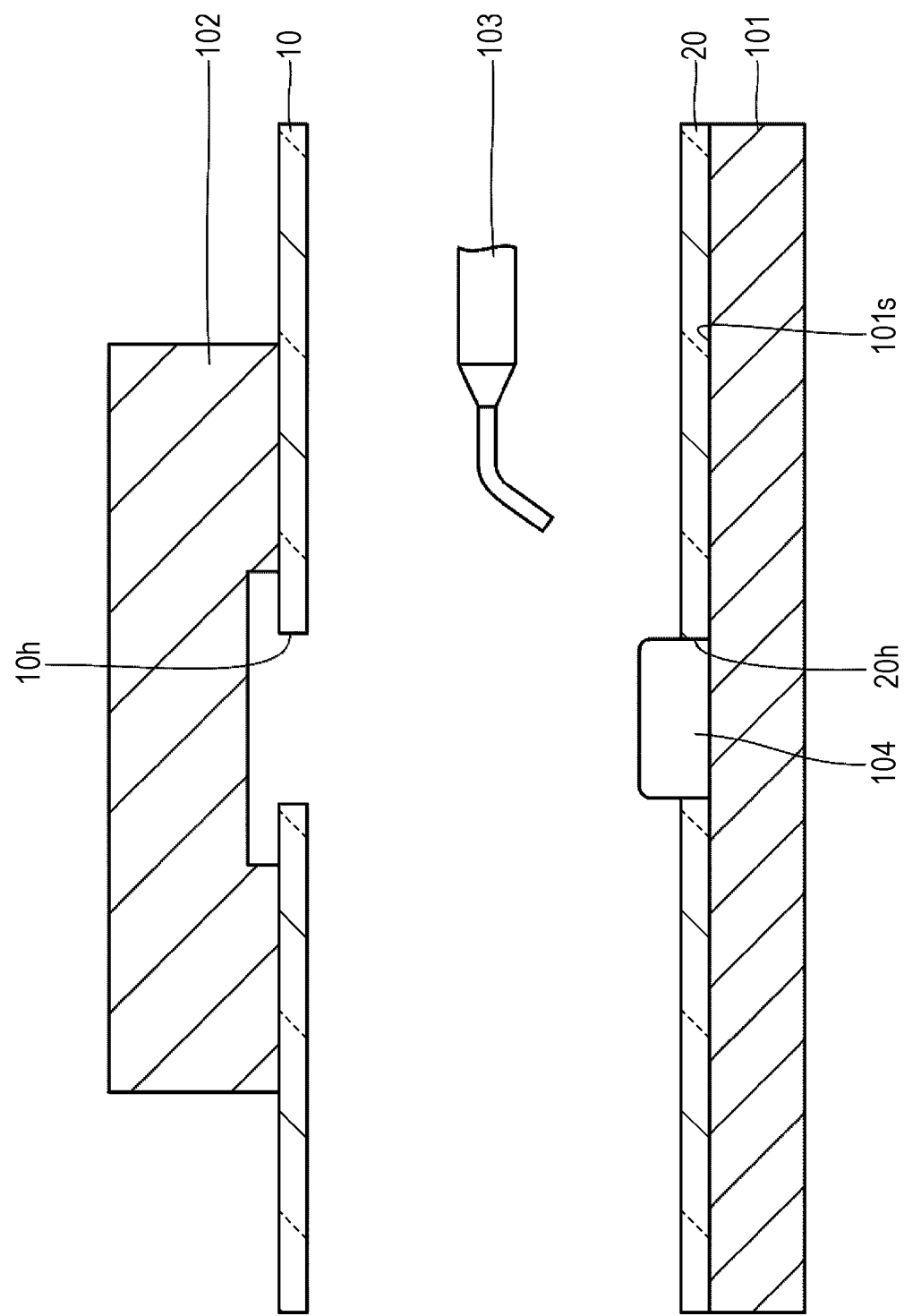
FIG. 3 is an outline cross-sectional view illustrating an example of a configuration of a spin coating apparatus.

Referring to FIG. 3, a description will be given of an example of a configuration of a spin coating apparatus which is used for producing the optical recording medium 1 with the aforementioned configuration. The spin coating apparatus is provided with a press stage 101, a press head 102, and a dispenser 103 as shown in FIG. 3. The press stage 101 includes a placement surface 101s for placing the second disc 20 thereon. At the center of the placement surface 101s, a substantially cylindrical center pin 104 onto which a center hole 20h of the second disc 20 is fitted is provided. The press head 102 is configured to be able to hold the first disc 10 by vacuum adsorption. In addition, the press head 102 is configured to be able to fit a center hole 10h of the held first disc 10 onto the center pin 104 and press the first disc 10 against the second disc 20 placed on the press stage 101. The dispenser 102 is for coating a surface of the second disc 20, which is placed on the press stage 101, on the side of the substrate 21 with the ultraviolet curable resin.

Attachment Apparatus

Figure 4:
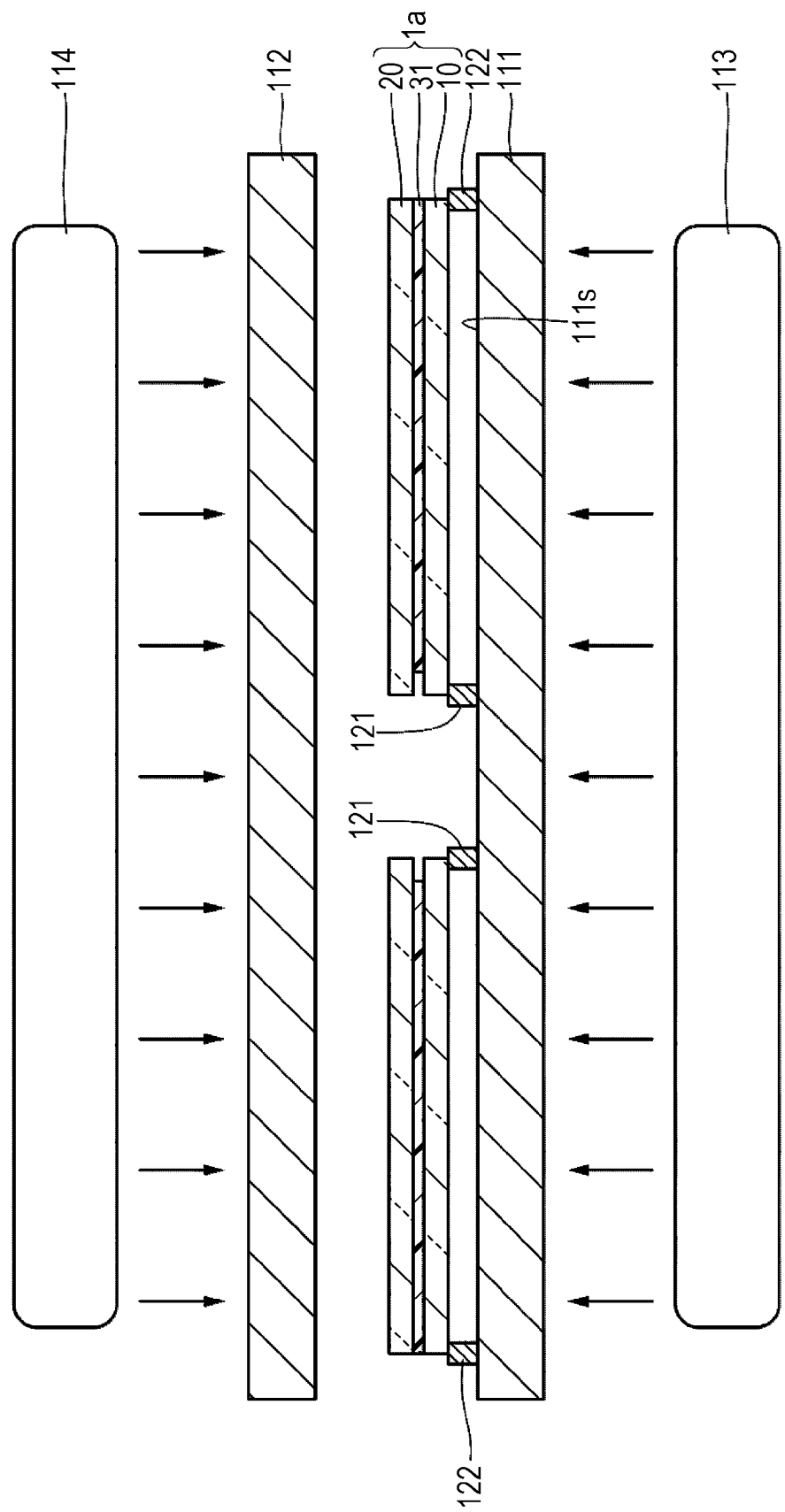
FIG. 4 is an outline cross-sectional view illustrating an example of a configuration of an attachment apparatus.

Referring to FIG. 4, a description will be given of an example of a configuration of an attachment apparatus which is used for producing the optical recording medium 1 with the aforementioned configuration. As shown in FIG. 4, the attachment apparatus is provided with a quartz table 111, a quartz mask 112, and ultraviolet lamps 113 and 114.

A placement surface 111s for placing the first disc 10 and the second disc 20 which are laminated with the ultraviolet curable resin in an uncured or half-cured state interposed therebetween (hereinafter, referred to as an "uncured optical recording medium 1a") is provided on the quartz table 111. The placement surface 111s is provided with an inner circumference support body 121 for supporting an inner circumferential portion of the uncured optical recording medium 1a and an outer circumference support body 122 for supporting an outer circumference portion of the uncured optical recording medium 1a. The inner circumference support body 121 and the outer circumference support body 122 are ring-shaped members or structures including a plurality of convexities which are arranged in circular shapes, for example.

The quartz mask 112 can be arranged so as to face the quartz table 111. The ultraviolet lamp 113 irradiates the uncured optical recording medium 1a, which is placed on the placement surface 111s of the quartz table 111, with ultraviolet light via the quartz table 111.

1.2 Manufacturing Method of Optical Recording Medium

Next, a description will be given of an example of a manufacturing method of an optical recording medium according to an embodiment of the present disclosure.

Process of Producing First Disc

The first disc 10 is produced as follows.

Process of Molding Substrate

First, the substrate 11 with the uneven surface formed on a surface thereof is molded. As a method of molding the substrate 11, it is possible to employ an injection molding (injection) method or a photo-polymerization method (2P method), for example.

Process of Forming Information Signal Layer L0

Next, the information signal layer L0 is formed by laminating the dielectric layer 43, the recording layer 41, and the dielectric layer 42 in this order on the substrate 11 by a sputtering method, for example.

Process of Forming Spacer Layer

Next, the ultraviolet curable resin is uniformly applied to the information signal layer L0 by a spin coating method, for example. Thereafter, an uneven pattern of a stamper is pressed against the ultraviolet curable resin which is uniformly applied to the information signal layer L0, the ultraviolet curable resin is irradiated with the ultraviolet light and is cured, and the stamper is then peeled off. In so doing, the uneven pattern of the stamper is transferred to the ultraviolet curable resin, and the spacer layer S1 with the land Ld and the groove Gv provided thereon is formed on the information signal layer L0.

Process of Forming Information Signal Layers L1 to Ln and Spacer Layers S2 to Sn Next, the information signal layer L1, the spacer layer S2, the information signal layer L3, ..., the spacer layer Sn, and the information signal layer Ln are laminated in this order on the spacer layer S1 in the same manner as in the aforementioned process of forming the information signal layer L0 and the spacer layer S1.

Process of Forming Light Transmitting Layer

Next, photosensitive resin such as ultraviolet curable resin (UV resin) is applied to the information signal layer Ln by the spin coating method, for example, and the photosensitive resin is irradiated with light such as ultraviolet light and is cured. In so doing, the light transmitting layer 12 is formed on the information signal layer Ln. As described above, the first disc 10 is produced.

Process of Producing Second Disc

Since the process of producing the second disc is the same as the aforementioned process of producing the first disc, the description thereof will be omitted.

Attachment Process

As described below, the spin coating apparatus as shown in FIG. 3 is used to extend ultraviolet curable resin as an adhesive between the first disc 10 and the second disc 20 which are produced as described above.

Figure 5A:
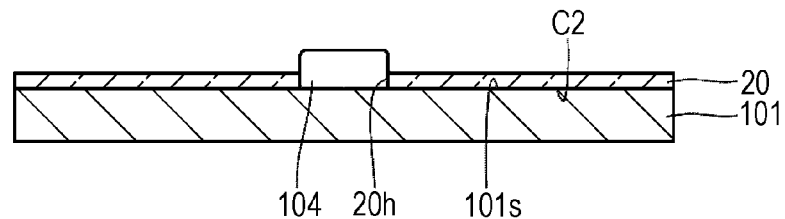
FIGS. 5A to 5E are process diagrams illustrating an example of a manufacturing method of the optical recording medium according to the first embodiment of the present disclosure.
Figure 5B:
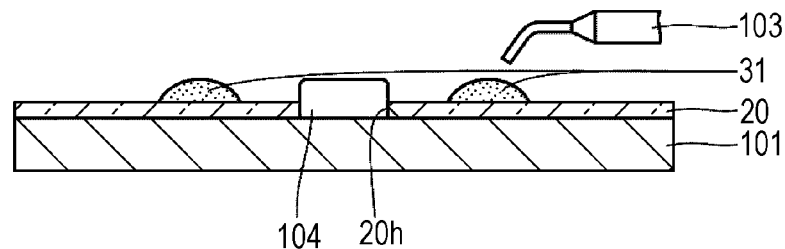

First, the second disc 20 is placed on the placement surface 101s of the press stage 101 such that the center hole 20h thereof is fitted onto the center pin 104 as shown in FIG. 5A. At this time, the second disc 20 is placed such that the second light irradiation surface C2 is located on the side of the placement surface 101s of the press stage 101. Then, ultraviolet curable resin 31 as an adhesive is applied in a ring shape to the inside of the center hole 20h by the dispenser 103 as shown in FIG. 5B.

Figure 5C:
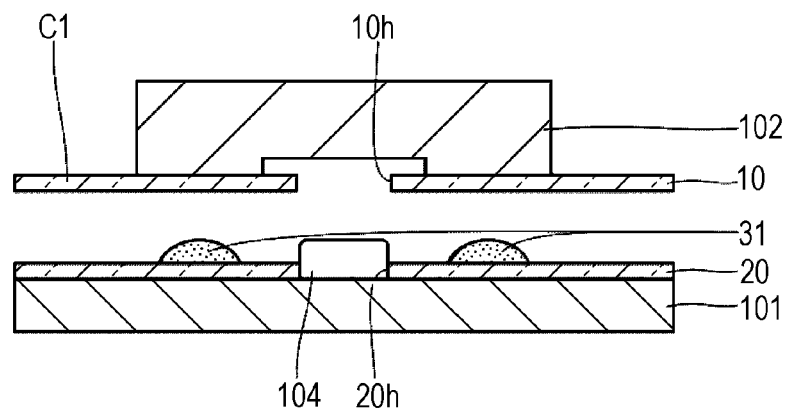
Figure 5D:
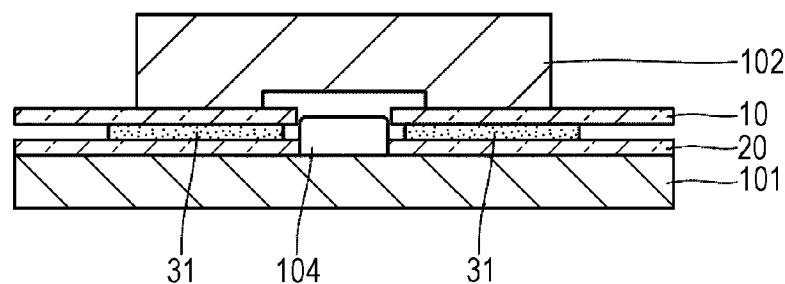

Then, the first light irradiation surface C1 of the first disc 10 is held by the press head 102 and the center hole 10h is fitted onto the center pin 104 as shown in FIG. 5C. Next, the first disc 10 is pressed against the second disc 20 via the ultraviolet curable resin 31 by the press head 102 until the thickness of the ultraviolet curable resin 31 becomes a predetermined thickness, for example, about 50 µm as shown in FIG. 5D.

Figure 5E:
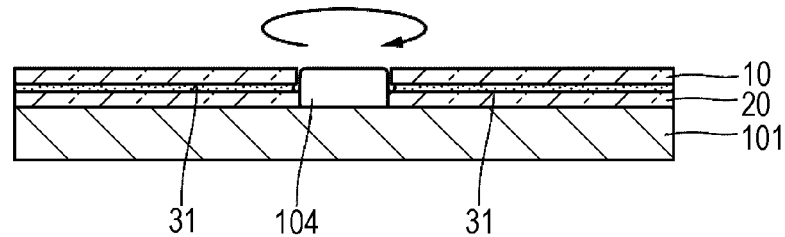

Next, the press stage 101 is rotated, and the ultraviolet curable resin 31 is extended in the radial direction of the first disc 10 and the second disc 20 between the first disc 10 and the second disc 20 as shown in FIG. 5E. In so doing, the ultraviolet curable resin 31 reaches from the inner circumferential portions to the outer circumferential portions of the first disc 10 and the second disc 20 between the first disc 10 and the second disc 20. As described above, the uncured optical recording medium 1a is obtained.

It is preferable that in the process of extending the ultraviolet curable resin 31, the outer circumferential portions of the first disc 10 and the second disc 20 are irradiated with the ultraviolet light and the ultraviolet curable resin 31 extended up to the outer circumferential portions is temporarily cured. In so doing, it is possible to suppress occurrence of separation between the first disc 10 and the second disc 20 at the outer circumferential portions thereof.

Attachment Process

As described below, the uncured optical recording medium 1a produced as described above is attached by using the attachment apparatus as shown in FIG. 4.

First, the uncured optical recording medium 1a is paced on the placement surface 111s of the quartz table 111 such that the inner circumferential portion and the outer circumferential portion are supported by the inner circumference support body 121 and the outer circumference support body 122. Next, the uncured optical recording medium 1a is irradiated with the ultraviolet light from the both sides thereof via the quartz table 111 and the quartz mask 114 by the ultraviolet lamps 113 and 114, and the ultraviolet curable resin 31 is cured while the center circumferential portion of the uncured optical recording medium 1a is in a non-contact state of being not supported. At this time, the ultraviolet curable resin 31 is cured such that the inversion rates of the ultraviolet curable resin 31 on both surface sides of the first disc 10 and the second disc 20 become equal or substantially equal to each other and become equal to or greater than 70%. In so doing, the targeted optical recording medium 1 is obtained.

1.3 Effects

According to the first embodiment, the thickness of each of the substrates 11 and 21 is equal to or greater than 0.3 mm and equal to or less than 0.545 mm, and transmittance of each of the discs 10 and 20 is equal to or less than 20%, and inversion rates on both surface sides of the attachment layer 30 are equal or substantially equal to each other and are equal to or greater than 70%. Therefore, it is possible to suppress occurrence of warpage of the optical recording medium 1 during and/or after the attachment process.

1.4 Modification Example

Although the description was made of a case in which all the multiple information signal layers have the same layer configuration in the aforementioned first embodiment, the information signal layers may have different layer configurations in accordance with properties (optical properties and durability, for example) necessary for the respective information signal layers. However, it is preferable to configure all the information signal layers to have the same layer configuration from the viewpoint of productivity.

Although the description was made of a configuration in which each information signal layer includes the recording layer, the dielectric layer provided so as to be adjacent to the upper surface of the recording layer, and the dielectric layer provided so as to be adjacent to the lower surface of the recording layer in the aforementioned first embodiment, the configuration of each information signal layer is not limited thereto. For example, the dielectric layer may be provided on at least one of the upper surface and the lower surface of the recording layer. In addition, the information signal layer may be configured only of the recording layer. By employing such a simple configuration, it is possible to reduce the costs of the optical recording medium and to improve the productivity thereof. The effects more significantly appears in a medium with a larger number of information signal layers.

Although the description was given of the case in which all the plurality of information signal layers are recordable recording layers in the aforementioned first embodiment, the plurality of information signal layers may be further provided with a recording layer, which is not a recordable type recording layer, in addition to the recordable recording layers.

Although the description was given of the example in which the present disclosure is applied to the recordable optical recording medium in the aforementioned first embodiment, types of the optical recording medium to which the present disclosure can be applied are not limited thereto, and the present disclosure may be applied to a reproduction dedicated optical recording medium or a rewritable optical recording medium.

Although the description was given of the example in which the recording layers contain the ternary oxidation product of the W oxidation product, the Pd oxidation product, and the Cu oxidation product as a main constituent in the first embodiment, the material composition of the recording layers is not limited to the example. For example, the recording layer may contain an oxidation product of metal X and an oxidation product of metal Y as main constituent. As the metal X, it is preferable to use a material which is substantially transparent and has an extinction coefficient of 0 or about 0 when the material becomes an oxidative product. From among the examples of the metal X with the aforementioned properties, it is preferable to use at least one kind selected from a group consisting of tungsten (W) and molybdenum (Mo). By using such a material such that thermal expansion of the oxidation product of the metal Y during recording does not become excessively large, it is possible to secure a sufficiently wide recording power margin and to suppress variations in transmittance before and after the recording.

As the metal Y, it is preferable to use a material which has an absorption coefficient to some extent and has an absolute value of standard free energy for formation smaller than that of the metal X when the metal Y becomes an oxidation product. By using such a material, the recording layer can absorb the laser light, convert the laser light into heat, release oxygen, and expand. Therefore, it is possible to record the information signal by the irradiation with the laser light. From among the examples of the metal Y with the aforementioned properties, it is preferable to use at least one kind selected from a group consisting of copper (Cu), manganese (Mn), nickel (Ni), and silver (Ag). This is because laser light recording power for recording the information signal can be reduced as compared with a case in which a metal material other than the aforementioned examples is used as the metal Y. The metal Y is preferably metal which contains at least Cu and is more preferably Cu from the viewpoint of improving the power margin. More specifically, the metal which contains at least Cu is a combination of Cu and at least one kind of metal selected from a group consisting of Mn, Ni, and Ag. From the viewpoint of realizing recording layers which contain smaller amount of precious metal or recording layers which do not contain precious metal (precious-metal-less recording layers), it is preferable that the metal Y is at least one kind selected from a group consisting of Cu, Nn, and Ni.

When a represents an atomic ratio of the metal X with respect to the sum of the metal X and the metal Y, and b represents an atomic ratio of the metal Y with respect to the sum of the metal X and the metal Y, a ratio (a/b) preferably satisfies a relationship of $0.1 \leq a/b \leq 2.7$ and more preferably satisfies a relationship of $0.25 \leq a/b \leq 2.7$. If the ratio (a/b) is equal to or greater than 0.1, it is possible to obtain a satisfactory power margin. In contrast, if the ratio (a/b) is equal to or less than 2.7, it is possible to record the information signal with a consumer drive in the future.

Alternatively, when a represents an atomic ratio of the metal X with respect to the sum of the metal X and the metal Y, and b represents an atomic ratio of the metal Y with respect to the sum of the metal X and the metal Y, the ratio (a/b) preferably satisfies a relationship of $0.1 \leq a/b \leq 1.3$ and more preferably satisfies a relationship of $0.25 \leq a/b \leq 1.3$. If the ratio (a/b) is equal to or greater than 0.1, it is possible to obtain a satisfactory power margin. In contrast, if the ratio (a/b) is equal to or less than 1.3, it is possible to record the information signal with a current consumer drive.

The recording layers preferably further contain an oxidation product of zinc (Zn) as an oxidation product of metal Z and contain the oxidation product of the metal X, the oxidation product of the metal Y, and the oxidation product of the metal Z as main constituents. This is because it is possible to reduce the content of the oxidation product of the metal Y and to reduce the costs of the optical recording medium. In a case in which the metal Y contains Ag, in particular, the recording layers preferably contain the oxidation product of the metal Z. This is because it is possible to reduce the content of Ag, which is precious metal, and to reduce the costs of the optical recording medium. When c represents an atomic ratio of the metal Z with respect to the sum of the metal X, the metal Y, and the metal Z, the atomic ratio c is preferably equal to or less than 50 at %. By setting the atomic ratio c to be equal to or less than 50 at %, it is possible to suppress deterioration of storage reliability.

Although the recording layers may contain a small amount of expensive previous metal such as Pd or Pt as a sub constituent, it is preferable that the recording layers do not contain the expensive precious metal such as Pd or Pt from the viewpoint of reducing the costs of the optical recording medium. In addition, it is only necessary for the recording layers to contain the oxidation product of the metal X and the oxidation product of the metal Y as main constituents, and addition of expensive precious metal such as Pd or Pt has substantially no influence on the recording property of the optical recording medium. In addition, Ag is excluded from the expensive precious metal described herein.

2. Second Embodiment

2.1 Outline

As an attachment type optical recording medium, an optical recording medium obtained by providing information signal layers in only one of two substrates is typically used. As a representative example of this type of medium, a digital versatile disc (DVD) has widely been used. According to a typical optical recording medium, a representative example of which is a DVD, some clearance (gap) is provided between the center pin of the spin coating apparatus and center holes of the two substrates. This is because recording or reproduction with laser light is performed only from a side of one substrate with the information signal layers provided therein. That is, this is because no problem occurs even if radial runout of the other substrate is greater than that of the substrate with the information signal layers provided therein when the center hole of the substrate is fitted onto the center pin of the drive and the recording or the reproduction is performed in or from the optical recording medium.

Figure 6A:
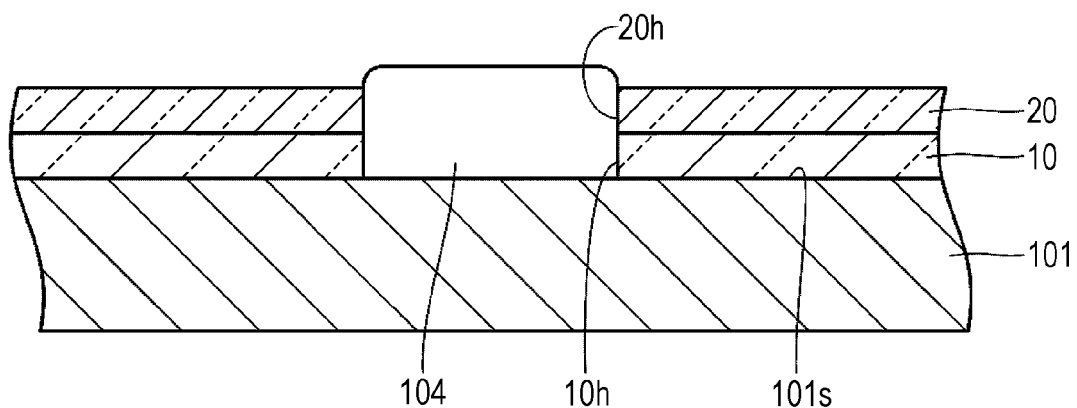
FIG. 6A is an outline cross-sectional view illustrating an example of a configuration of a center pin of the spin coating apparatus.

However, according to the aforementioned optical recording medium 1 of the first embodiment, the recording or the reproduction with the laser light is performed from both surfaces of the first disc 10 and the second disc 20. For this reason, it is desirable to suppress the clearance between the center pin of the spin coating apparatus and the structure obtained by attaching the first disc 10 and the second disc 20 to some extent and to suppress the radial runout of both the substrates 11 and 21 to a small value. Thus, the present inventors conducted intensive studies in order to suppress the radial runout of the first disc 10 and the second disc 20. As a result, the present inventors discovered a scheme of setting diameters of the center holes 10h and 20h of the first disc 10 and the second disc 20 to be equal or substantially equal to the diameter of the center pin 104 of the spin coating apparatus and press-fitting the center holes 10h and 20h of the first disc 10 and the second disc 20 onto the center pin 104 of the spin coating apparatus as shown in FIG. 6A.

Figure 6B:
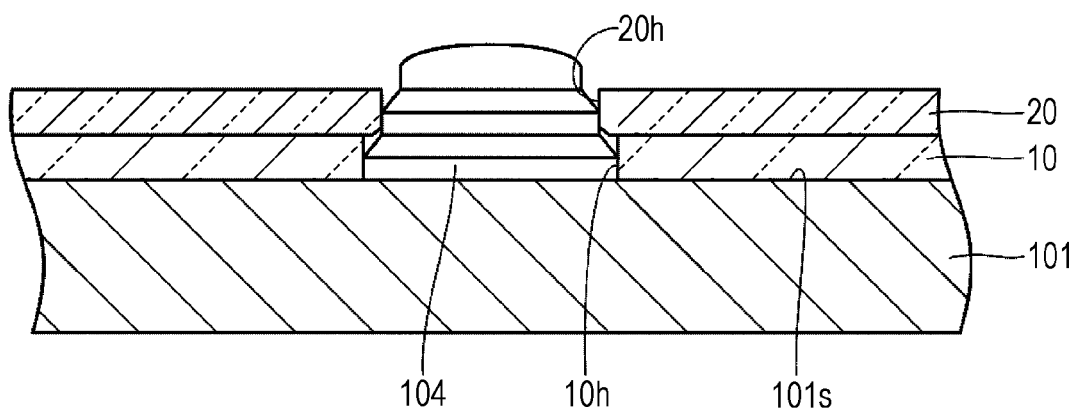
FIG. 6B is an outline cross-sectional view illustrating an example of a configuration of a center pin of a spin coating apparatus according to a second embodiment of the present disclosure.

However, according to the aforementioned press-fitting scheme, a contact area between the center holes 10h and 20h of the first disc 10 and the second disc 20 and the center pin 104 of the spin coating apparatus is large. Therefore, it is difficult to pull out of the center pin 104 after extending the ultraviolet curable resin is extended between the center holes 10h and 20h. Thus, the present inventors achieved the idea of the center holes 10h and 20h which have different diameters and the idea of the center pin 141 which has a plurality of circumferential surface in accordance with the diameters of the center holes 10h and 20h as shown in FIG. 6B. Hereinafter, a description will be given of the optical recording medium and the spin coating apparatus.

2.2 Configuration of Optical Recording Medium

Figure 7A:
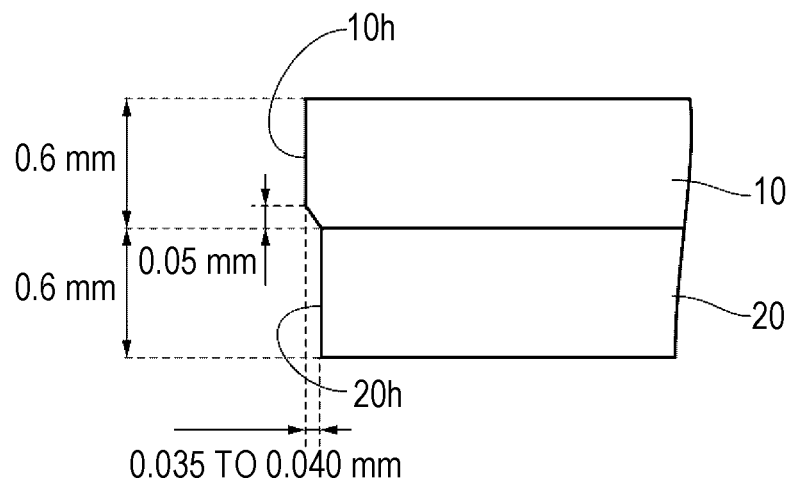
FIG. 7A is a cross-sectional view illustrating opening portions of first and second discs in an enlarged manner.

As shown in FIG. 7A, the diameter of the center hole 10h of the first disc 10 is set to be smaller than the diameter of the center hole 20h of the second disc 20. The circumferential surface of the center hole 10h of the first disc 10 is set on a further inner side than the circumferential surface of the center hole 20h of the second disc 20 by 0.035 mm to 0.040 mm, for example.

2.3 Configuration of Spin Coating Apparatus

Figure 7B:
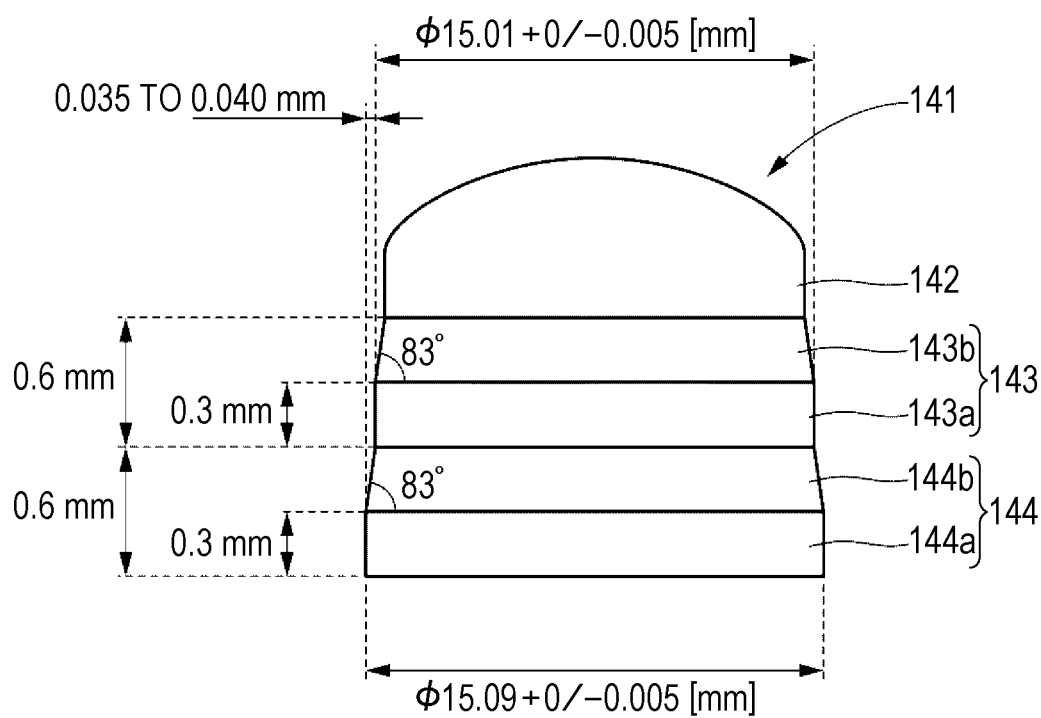
FIG. 7B is a side view illustrating the center pin in the enlarged manner.

As shown in FIG. 7B, the center pin 141 of the spin coating apparatus is provided with a top portion 142, a first fitting portion 143, and a second fitting portion 144 in this order from the top side toward the lower side of the center pin 141. The top portion 142 has a tip end with a dome-shaped curved surface.

The first fitting portion 143 includes a first columnar surface portion 143a and a first oblique surface portion 143b. The first columnar surface portion 143a has a cylindrical surface, and a diameter of the cylindrical surface is set to be equal or substantially equal to the diameter of the center hole 10h of the first disc 10. The center hole 10h of the first disc 10 is fitted onto the first columnar surface portion 143a.

The clearance between the first columnar surface portion 143a and the center hole 10h of the first disc 10 is preferably equal to or less than 5 µm and is more preferably equal or substantially equal to 0 µm. This is because it is possible to suppress the radial runout of the first disc 10 and to suppress occurrence of the tracking error during the recording or the reproduction in or from the first disc 10.

The first oblique surface portion 143b is provided above the first columnar surface portion 143a and has an oblique surface which is gradually inclined inward from the lower side toward the top portion of the center pin 141. By the oblique surface, it is possible to reduce the contact area between the center hole 10h of the first disc 10 and the first fitting portion 143. Therefore, it is possible to easily pull out the first disc 10 from the first fitting portion 143.

The second fitting portion 144 includes a second columnar surface portion 144a and a second oblique surface portion 144b. The second columnar surface portion 144a has a cylindrical surface, and the diameter of the cylindrical surface is set to be equal or substantially equal to the diameter of the center hole 20h of the second disc 20. The center hole 20h of the second disc 20 is fitted onto the second columnar surface portion 144a.

The clearance between the second columnar surface portion 144a and the center hole 20h of the second disc 20 is preferably equal to or less than 5 µm and is more preferably equal or substantially equal to 0 µm. This is because it is possible to suppress the radial runout of the second disc 20 and to suppress occurrence of the tracking error during the recording or the reproduction in or from the second disc 20.

The second oblique surface portion 144b is provided above the second columnar surface portion 144a and has an oblique surface which is gradually inclined inward from the lower side toward the top portion of the center pin 141. By the oblique surface, it is possible to reduce the contact area between the center hole 20h of the second disc 20 and the second fitting portion 144. Therefore, it is possible to easily pull out the second disc 20 form the second fitting portion 144.

EXAMPLES

Hereinafter, the present disclosure will be specifically described based on examples. However, the present disclosure is not limited to these examples. In the examples, the same reference numerals will be provided to components corresponding to those in the first embodiment, and the descriptions thereof will be given.

Inversion Rates

In the examples, inversion rates (inversion rates of a double combination) at first and second disc-side interfaces were calculated based on absorbance of infrared spectroscopic (IR) spectra measured by an ATR method.

Transmittance

In the examples, transmittance of the first disc 10 and the second disc 20 at a wavelength of 365 nm was measured by using a spectrophotometer (manufactured by JASCO Corporation, Product name: V-530).

Examples 1-1 to 1-3 and Comparative Example 1-1

Process of Producing First Disc

The first disc 10 was produced as follows. First, a polycarbonate substrate 11 (hereinafter, referred to as a "PC" substrate") with a thickness from 0.3 mm to 0.6 mm was molded by the injection molding. Then, the first disc 10 with transmittance of 10% was obtained by sequentially laminating the information signal layer L0, the spacer layer S1, . . . , the spacer layer S3, the information signal layer L4, and the light transmitting layer 12 on the PC substrate 11.

In addition, the information signal layers L0 to L4 were configured to have laminated structures, each of which included the dielectric layer 43, the recording layer 41, and the dielectric layer 42. Moreover, the transmittance was set by adjusting the film thicknesses of the respective layers which configured the information signal layers L0 to L4.

Process of Producing Second Disc

In the same manner as in the aforementioned process of producing the first disc 10, the second disc 20 was obtained.

Attachment Process

The thus obtained first disc 10 and the second disc 20 were attached to each other by using ultraviolet curable resin as an adhesive as follows.

First, the second disc 20 was transported to the spin coating apparatus as shown in FIG. 3, and the second disc 20 was placed on the placement surface 101s of the press stage 101 such that the center hole 20h was fitted onto the center pin 104. At this time, the second disc 20 was placed such that the second light irradiation surface C2 was located on the side of the placement surface 101s of the press stage 101. Then, the ultraviolet curable resin 31 as an adhesive was applied to the inside of the center hole 20h in a ring shape by the dispenser 103.

Then, the first light irradiation surface C1 of the first disc 10 was held by the press head 102, and at the same time, the center hole 10h was fitted onto the center pin 104. Then, the first disc 10 was pressed against the second disc 20 via the ultraviolet curable resin 31 by the press head 102 until the thickness of the ultraviolet curable resin 31 became about 50 μm.

Next, the press stage 101 was rotated, and the ultraviolet curable resin 31 was extended in the radial direction of the first disc 10 and the second disc 20 between the first disc 10 and the second disc 20. In so doing, the ultraviolet curable resin 31 was made to reach from the inner circumferential portions to the outer circumferential portions of the first disc 10 and the second disc 20 between the first disc 10 and the second disc 20. As described above, the uncured optical recording medium 1a was obtained.

In the process of extending the ultraviolet curable resin 31, the outer circumferential portions of the first disc 10 and the second disc 20 were irradiated with ultraviolet light of 100 mJ/cm$^2$, and the ultraviolet curable resin 31 extended up to the outer circumferential portions was temporarily cured.

Then, the uncured optical recording medium 1a was transported to the attachment apparatus as shown in FIG. 4 and was placed on the placement surface 111s of the quartz table 111 such that the inner circumferential portion and the outer circumferential portion thereof were supported by the inner circumference support body 121 and the outer circumference support body 122, respectively. Then, the uncured optical recording medium 1a was irradiated with the ultraviolet light from both surface sides by the ultraviolet lamps 113 and 114, and the ultraviolet curable resin 31 was cured. At this time, the ultraviolet ray irradiation amount was adjusted such that the inversion rate at the interface between the first disc 10 and the attachment layer 30 (the interface on the side of the first disc) and the inversion rate at the interface between the second disc 20 and the attachment layer 30 (the interface on the side of the second disc) became 80% and 80%, respectively. As described above, the targeted optical recording medium 1 was obtained.

Comparative Example 1-2

As shown in Table 1, the optical recording medium 1 was obtained in the same manner as in Example 1-1 other than that the thickness of each of the substrates 11 and 21 was set to 0.5 mm, the transmittance of the first disc 10 and the second disc 20 was set to 5%, the inversion rate at the interface on the side of the first disc was set to 80%, the inversion rate at the interface on the side of the second disc was set to 60%, and the difference between the inversion rates was set to 20%.

Examples 2-1 to 2-4 and Comparative Examples 2-1 to 2-9

As shown in Table 1, the optical recording mediums 1 were obtained in the same manner as in Example 1-1 other than that the thickness of each of the substrates 11 and 21 was set to 0.45 m, the transmittance of the first disc 10 and the second disc 20 was set to 5% to 20%, the inversion rates at the interfaces on the sides of the first disc and on the side of the second disc were set to 60% to 80%, and the difference between the inversion rates was set to 0% to 20%.

Examples 3-1 to 3-4 and Comparative Examples 3-1 to 3-9

As shown in Table 1, the optical recording mediums 1 were obtained in the same manner as in Example 1-1 other than that the thickness of each of the substrates 11 and 21 was set to 0.50 mm, the transmittance of the first disc 10 and the second disc 20 was set to 5% to 20%, the inversion rates at the interfaces on the side of the first disc and on the side of the second disc were set to 60% to 80%, and the difference between the inversion rates was set to 0% to 20%.

Examples 4-1 to 4-4 and Comparative Examples 4-1 to 4-9

As shown in Table 1, the optical recording mediums 1 were obtained in the same manner as in Example 1-1 other than that the thickness of each of the substrates 11 and 21 was set to 0.545 mm, the transmittance of the first disc 10 and the second disc 20 was set to 5% to 20%, the inversion rates at the interfaces on the side of the first disc and on the side of the second disc were set to 60% to 80%, and the difference between the inversion rates was set to 0% to 20%.

Comparative Example 5-1

As shown in Table 1, the optical recording medium 1 was obtained in the same manner as in Example 1-1 other than that the thickness of each of the substrates 11 and 21 was set to 0.6 mm, the transmittance of the first disc 10 and the second disc 20 was set to 5%, the inversion rate at the interface on the side of the first disc was set to 80%, the inversion rate at the interface on the side of the second disc was set to 60%, and the difference between the inversion rates was set to 20%.

Evaluation of R-Skew

R-skew (radial skew) of the thus obtained optical recording mediums 1 in Examples 1-1 to 4-4 and Comparative Examples 1-1 to 5-1 immediately after the attachment was measured. Then, a storage test in which each of the optical recording mediums 1 was held in an environment of 55° C. for ninety six hours was conducted in a state in which the outer circumference of each optical recording medium 1 was held at two points. By the test, it was possible to check a reach point of creeping (deformation under a condition in that specific load is continuously applied). Then, R-skew after the storage test was measured.

Next, durability of each optical recording medium 1 was evaluated using the following criteria based on the measured R-skew after the storage test.

A: R-skew was less than 0.7° and excellent durability was obtained.

B: R-skew was equal to or greater than 0.7° and less than 1.0 and allowable durability was obtained.

C: R-skew was equal to or greater than 1.0° and durability deteriorated.

Table 1 shows the evaluation results of the optical recording mediums 1 in Examples 1-1 to 4-4 and Comparative Examples 1-1 to 5-1.

TABLE 1

| | Thickness of substrate [mm] | Transmittance | Inversion rate (first disc side) | Inversion rate (second disc side) | Difference in inversion rates | R-skew after attachment [°] | R-skew after horizontal retention [°] | Determination |
|---|---|---|---|---|---|---|---|---|
| Example 1-1 | 0.3 | 10% | 80% | 80% | 0% | 0.61 | 0.81 | B |
| Example 1-2 | 0.4 | | | | | 0.71 | 0.92 | B |
| Example 1-3 | 0.5 | | | | | 0.44 | 0.65 | A |
| Comparative Example 1-1 | 0.6 | | | | | 0.92 | 1.12 | C |
| Comparative Example 1-2 | 0.5 | 5% | 80% | 60% | 20% | 1.19 | 1.58 | C |
| Example 2-1 | 0.45 | 20% | 80% | 80% | 0% | 0.45 | 0.66 | A |
| Comparative Example 2-1 | | | 60% | 60% | 0% | 1.00 | 1.42 | C |
| Comparative Example 2-2 | | | 80% | 70% | 10% | 1.49 | 1.83 | C |
| Comparative Example 2-3 | | | 80% | 60% | 20% | 1.55 | 2.03 | C |
| Example 2-2 | | 15% | 80% | 80% | 0% | 0.47 | 0.69 | A |
| Comparative Example 2-4 | | | 60% | 60% | 0% | 1.08 | 1.49 | C |
| Comparative Example 2-5 | | | 80% | 70% | 10% | 1.57 | 1.92 | C |
| Comparative Example 2-6 | | | 80% | 60% | 20% | 1.73 | 2.13 | C |
| Example 2-3 | | 10% | 80% | 80% | 0% | 0.66 | 0.69 | A |
| Comparative Example 2-7 | | | 60% | 60% | 0% | 1.18 | 1.62 | C |
| Comparative Example 2-8 | | | 80% | 70% | 10% | 1.75 | 2.07 | C |
| Comparative Example 2-9 | | | 80% | 60% | 20% | 1.84 | 2.29 | C |
| Example 2-4 | | 5% | 80% | 80% | 0% | 0.35 | 0.68 | A |
| Example 3-1 | 0.50 | 20% | 80% | 80% | 0% | 0.18 | 0.48 | A |
| Comparative Example 3-1 | | | 60% | 60% | 0% | 0.66 | 1.04 | C |
| Comparative Example 3-2 | | | 80% | 70% | 10% | 0.82 | 1.33 | C |
| Comparative Example 3-3 | | | 80% | 60% | 20% | 1.03 | 1.48 | C |
| Example 3-2 | | 15% | 80% | 80% | 0% | 0.23 | 0.51 | A |
| Comparative Example 3-4 | | | 60% | 60% | 0% | 0.63 | 1.09 | C |
| Comparative Example 3-5 | | | 80% | 70% | 10% | 1.07 | 1.40 | C |
| Comparative Example 3-6 | | | 80% | 60% | 20% | 1.08 | 1.55 | C |
| Example 3-3 | | 10% | 80% | 80% | 0% | 0.35 | 0.57 | A |
| Comparative Example 3-7 | | | 60% | 60% | 0% | 0.78 | 1.18 | C |
| Comparative Example 3-8 | | | 80% | 70% | 10% | 1.20 | 1.51 | C |
| Comparative Example 3-9 | | | 80% | 60% | 20% | 1.23 | 1.67 | C |
| Example 3-4 | | 5% | 80% | 80% | 0% | 0.31 | 0.50 | A |
| Example 4-1 | 0.545 | 20% | 80% | 80% | 0% | 0.41 | 0.66 | A |
| Comparative Example 4-1 | | | 60% | 60% | 0% | 0.80 | 1.18 | C |
| Comparative Example 4-2 | | | 80% | 70% | 10% | 1.08 | 1.40 | C |
| Comparative Example 4-3 | | | 80% | 60% | 20% | 1.09 | 1.51 | C |
| Example 4-2 | | 15% | 80% | 80% | 0% | 0.49 | 0.68 | A |
| Comparative Example 4-4 | | | 60% | 60% | 0% | 0.78 | 1.22 | C |
| Comparative Example 4-5 | | | 80% | 70% | 10% | 1.09 | 1.45 | C |
| Comparative Example 4-6 | | | 80% | 60% | 20% | 1.17 | 1.57 | C |
| Example 4-3 | | 10% | 80% | 80% | 0% | 0.55 | 0.78 | A |
| Comparative Example 4-7 | | | 60% | 60% | 0% | 0.83 | 1.28 | C |
| Comparative Example 4-8 | | | 80% | 70% | 10% | 1.20 | 1.53 | C |
| Comparative Example 4-9 | | | 80% | 60% | 20% | 1.29 | 1.65 | C |
| Example 4-4 | | 5% | 80% | 80% | 0% | 0.50 | 0.67 | A |
| Comparative Example 5-1 | 0.6 | 5% | 80% | 60% | 20% | 2.21 | 2.66 | C |

It is possible to know the following facts from Table 1.

By setting the thickness of each of the substrates 11 and 21 to be equal to or greater than 0.3 mm and equal to or less than 0.545 mm, setting the transmittance of the first disc 10 and the second disc 20 to be equal to or less than 20%, and setting the inversion rates at both surface sides of the attachment layer 30 to be equal or substantially equal to each other and to be equal to or greater than 70%, it is possible to suppress occurrence of warpage of the optical recording medium 1 after the storage test.

By setting the thickness of each of the substrates 11 and 21 to be equal to or greater than 0.445 mm and equal to or less than 0.545 mm, setting the transmittance of the first disc 10 and the second disc 20 to be equal to or less than 20%, and setting the inversion rates on both surface sides of the attachment layer 30 to be equal or substantially equal to each other and to be equal to or greater than 70%, it is possible to further suppress occurrence of warpage of the optical recording medium 1 after the storage test.

Example 6-1

An attachment apparatus in which both the inner circumference support body 121 and the outer circumference support body 122 were not provided was used instead of the attachment apparatus as shown in FIG. 4, and an entire main surface of the optical recording medium 1a was placed on the placement surface 111s of the quartz table 111. The optical recording medium 1 was obtained in the same manner as in Example 1-3 other than this point.

Example 6-2

An attachment apparatus in which the outer circumference support body 122 was not provided and only the inner circumference support body 121 was provided was used instead of the attachment apparatus as shown in FIG. 4, and only the inner circumferential portion of the optical recording medium 1a was supported by the inner circumference support body 121. The optical recording medium 1 was obtained in the same manner as in Example 6-1 other than this point.

Example 6-3

An attachment apparatus in which the inner circumference support body 121 was not provided and only the outer circumference support body 122 was provided was used instead of the attachment apparatus as shown in FIG. 4, and only the outer circumferential portion of the optical recording medium 1a was supported by the outer circumference support body 122. The optical recording medium 1 was obtained in the same manner as in Example 6-1 other than this point.

Example 6-4

The attachment apparatus as shown in FIG. 4 was used, and both the inner circumferential portion and the outer circumferential portion of the optical recording medium 1a were supported by the inner circumference support body 121 and the outer circumference support body 122. The optical recording medium 1 was obtained in the same manner as in Example 6-1 other than this point.

Example 6-5

The optical recording medium 1a was pinched between glass plates, the uncured optical recording medium 1a was irradiated with ultraviolet light from both surface sides by the ultraviolet lamps 113 and 114, and the ultraviolet curable resin 31 was cured. The optical recording medium 1 was obtained in the same manner as in Example 6-1 other than this point.

Evaluation of R-Skew

R-skew of the thus obtained optical recording mediums 1 in Examples 6-1 to 6-5 after the storage test was evaluated in the same manner as that for the aforementioned Examples 1-1 to 4-4 and Comparative Examples 1-1 to 5-1, and durability was evaluated.

Table 2 shows the evaluation results of the optical recording mediums 1 in Examples 6-1 to 6-5.

TABLE 2

|  | Thickness of substrate | Transmittance | Inversion rate | | Difference between inversion rates | Retention rate | Determination |
|  |  |  | First disc side | Second disc side |  |  |  |
| --- | --- | --- | --- | --- | --- | --- | --- |
| Example 6-1 | 0.5 mm | 10% | 80% | 80% | 0% | Entire surface is supported | B |
| Example 6-2 |  |  |  |  |  | Only inner circumference is supported | B |
| Example 6-3 |  |  |  |  |  | Only inner circumference is supported | B |
| Example 6-4 |  |  |  |  |  | Only inner and outer circumference are supported | A |
| Example 6-5 |  |  |  |  |  | Interposed between glasses | B |

It is possible to know the following facts from Table 2.

It is possible to suppress occurrence of R-skew after the storage test to the maximum extent when the attachment is performed in the state in which only the inner circumferential portion and the outer circumferential portion of the optical recording medium 1a are supported by the inner circumference support body 121 and the outer circumference support body 122 and the center circumferential portion is in the non-contact state of being not supported. That is, it is possible to obtain high durability.

Example 7-1

The optical recording medium 1 was obtained in the same manner as in Example 1-3 other than that irradiation of the outer circumferential portions of the first disc 10 and the second disc 20 with the ultraviolet light was omitted in the process of extending the ultraviolet curable resin 31.

Example 7-2

The optical recording medium 1 was obtained in the same manner as in Example 1-3 other than that the irradiation amount of the ultraviolet light, with which the outer circumferential portions of the first disc 10 and the second disc 20 were irradiated, was set to 90 mJ/cm2 in the process of extending the ultraviolet curable resin 31.

Example 7-3

The optical recording medium 1 was obtained in the same manner as in Example 1-3 other than that the irradiation amount of the ultraviolet light, with which the outer circumferential portions of the first disc 10 and the second disc 20 were irradiated, was set to 180 mJ/cm2 in the process of extending the ultraviolet curable resin 31.

Evaluation of R-Skew and Separation Between Outer Circumferences

R-skew of the thus obtained optical recording mediums 1 in Examples 7-1 to 7-3 immediately after the attachment was measured. In addition, the interval between the first disc 10 and the second disc 20 at a radial position from 55 mm to 60 mm was measured.

Table 3 shows the evaluation results of the optical recording mediums 1 in Examples 7-1 to 7-3.

TABLE 3

| | Amount of UV irradiation for temporary curing | Attachment R-skew Pk-Pk | Separation of outer circumferences Δt: R60-R55 |
|---|---|---|---|
| Example 7-1 | None | 0.44 | 50 μm |
| Example 7-2 | 90 mJ/cm² | 0.44 | 10 μm |
| Example 7-3 | 180 mJ/cm² | 0.44 | 10 μm |

It is possible to know the following facts from Table 3.

By performing the temporary curing process of irradiating the outer circumferential portions of the first disc 10 and the second disc 20 with the ultraviolet light in the process of extending the ultraviolet curable resin 31, it is possible to suppress the separation between the outer circumferential portions of the first disc 10 and the second disc 20.

In addition, if the irradiation amount of the ultraviolet light is within the range of equal to or greater than 90 mJ/cm2 and equal to or less than 180 mJ/cm2, substantially no influence of the temporary curing process on R-skew is observed.

Examples 8-1 to 8-5

In the process of extending the ultraviolet curable resin, the placement position of the first disc 10 relative to the second disc 20 was adjusted. A plurality of optical recording mediums 1 in which the first discs 10 had different radial runout were obtained in the same manner as in Example 1-3 other than this point.

Evaluation of Tracking Error

Tracking errors when the first discs 10 of the thus obtained optical recording mediums 1 in Examples 8-1 to 8-5 were reproduced at a linear speed of 35 m/S were evaluated. The results will be shown in FIG. 8A.

Figure 8A:
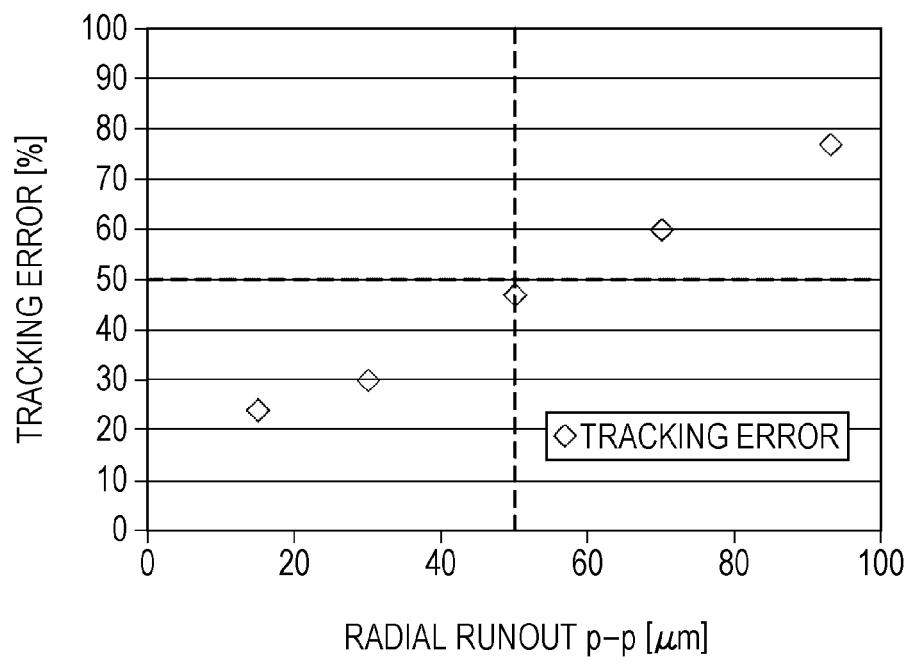
FIG. 8A is a diagram illustrating a relationship between a radial runout and a tracking error.

It is possible to know from FIG. 8A that the tracking errors tend to occur as the radial runout increases. In order to suppress the tracking errors to a rate of equal to or less than 50%, it is desirable to set the radial runout to be equal to or less than 50%. In the technical field of the optical recording medium, the tracking errors are typically set to a rate of equal to or less than 50%.

Examples 8-1 to 8-6

A plurality of optical recording mediums 1 were obtained in the same manner as in Example 1-3 other than that the clearances between the center holes 10h and 20h of the first disc 10 and the second disc 20 and the center pin 104 of the spin coating apparatus were differentiated. In addition, eight optical recording mediums 1 were produced for each clearance. That is, eight optical recording mediums 1 were produced in each of Examples 8-1 to 8-6.

Evaluation of Radial Runout

Radial runout of the first discs 10 of the thus obtained optical recording mediums 1 in Examples 8-1 to 8-5 was measured. The results will be shown in FIG. 8B.

Figure 8B:
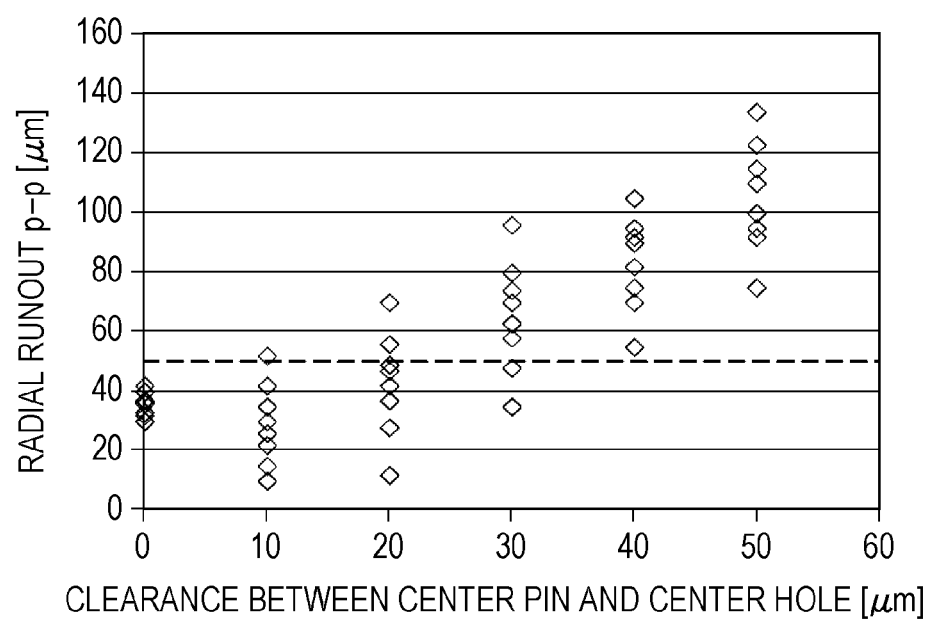
FIG. 8B is a diagram showing a relationship between a radial runout and a clearance between a center pin and a center hole.

It is possible to know from FIG. 8B that it is desirable to set the clearance to be equal or substantially equal to zero in order to set the radial runout to be equal to or less than 50 □m.

Although specific descriptions were given of the embodiments, modification examples thereof, and examples of the present disclosure, the present disclosure is not limited to the aforementioned embodiments, the modification examples thereof, and examples, and various modifications based on the technical idea of the present disclosure can be made.

For example, the configurations, the methods, the processes, the shapes, the materials, the numerical values, and the like in the aforementioned embodiments, the modification examples thereof, and the examples were described only for the illustrative purposes, and different configurations, methods, processes, shapes, materials, numerical values and the like from those described above may be employed as necessary.

In addition, the configurations, the methods, the processes, the shapes, the materials, the numerical values, and the like in the aforementioned embodiments, the modification examples thereof, and examples can be employed in combination without departing from the gist of the present disclosure.

In addition, the present disclosure can employ the following configurations.

(1) An optical recording medium including: two discs, each of which includes a substrate and a plurality of recording layers; and an attachment layer which is provided between the two discs and includes ultraviolet curable resin, wherein thickness of each of the substrates in the two discs is equal to or greater than 0.3 mm and equal to or less than 0.545 mm, wherein transmittance of the two discs is equal to or less than 20%, and wherein inversion rates on both surface sides of the attachment layer are equal or substantially equal to each other, and are equal to or greater than 70%.

(2) The optical recording medium according to (1), wherein the thickness of each of the substrates in the two discs is equal to or greater than 0.445 mm and equal to or less than 0.545 mm.

(3) The optical recording medium according to (1) or (2), wherein a thickness of the attachment layer is equal to or greater than 0.01 mm and equal to or less than 0.22 mm.

(4) The optical recording medium according to any one of (1) to (3), wherein the transmittance of the two discs is equal to or greater than 5% and equal to or less than 20%.

(5) The optical recording medium according to any one of (1) to (4), wherein the substrates in the two discs contain plastic resin.

(6) The optical recording medium according to any one of (1) to (5), wherein the ultraviolet curable resin is radical polymerization-type ultraviolet curable resin.

(7) The optical recording medium according to any one of (1) to (6), further including: light irradiation surfaces which are provided on both surfaces so as to be irradiated with light for recording or reproducing an information signal.

(8) The optical recording medium according to any one of (1) to (7), wherein diameters of openings which are respectively provided at centers of the two discs are different.

(9) A manufacturing method of an optical recording medium including: irradiating, with ultraviolet light, an ultraviolet curable resin layer interposed between two discs from both sides of the two discs, each of which includes a substrate and a plurality of recording layers, and curing the ultraviolet curable resin such that inversion rates on both surface sides of the ultraviolet curable resin layer becomes equal or substantially equal to each other and become equal to or greater than 70%, wherein a thickness of each of the substrates in the two discs is equal to or greater than 0.3 mm and equal to or less than 0.545 mm, and wherein transmittance of the two discs is equal to or less than 20%.

(10) The manufacturing method of an optical recording medium according to (9), wherein the irradiation of the ultraviolet curable resin layer with the ultraviolet light is performed in a state in which only inner circumferential portions and outer circumferential portions of a first disc and a second disc are supported and center circumferential portions are not supported and are in a non-contact state.

(11) The manufacturing method of an optical recording medium according to (9) or (10), further including: interposing the ultraviolet curable resin layer between the two discs by extending ultraviolet curable resin disposed between the two discs.

(12) The manufacturing method of an optical recording medium according to (11), further including: irradiating, with the ultraviolet light, the ultraviolet curable resin, which is extended to the outer circumferential portions of the two discs, while the ultraviolet curable resin is extended.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention is claimed as follows:

1. An optical recording medium comprising:
    two discs, each of which includes a substrate and a plurality of recording layers; and
    an attachment layer which is provided between the two discs and includes ultraviolet curable resin,
    wherein thickness of each of the substrates in the two discs is equal to or greater than 0.3 mm and equal to or less than 0.545 mm,
    wherein transmittance of the two discs is equal to or less than 20%, and
    wherein inversion rates on both surface sides of the attachment layer are equal or substantially equal to each other, and are equal to or greater than 70%.

2. The optical recording medium according to claim 1, wherein the thickness of each of the substrates in the two discs is equal to or greater than 0.445 mm and equal to or less than 0.545 mm.

3. The optical recording medium according to claim 1, wherein a thickness of the attachment layer is equal to or greater than 0.01 mm and equal to or less than 0.22 mm.

4. The optical recording medium according to claim 1, wherein the transmittance of the two discs is equal to or greater than 5% and equal to or less than 20%.

5. The optical recording medium according to claim 1, wherein the substrates in the two discs contain plastic resin.

6. The optical recording medium according to claim 1, wherein the ultraviolet curable resin is radical polymerization-type ultraviolet curable resin.

7. The optical recording medium according to claim 1, further comprising:
    light irradiation surfaces which are provided on both surfaces so as to be irradiated with light for recording or reproducing an information signal.

8. The optical recording medium according to claim 1, wherein diameters of openings which are respectively provided at centers of the two discs are different.

9. A manufacturing method of an optical recording medium comprising:
    irradiating, with ultraviolet light, an ultraviolet curable resin layer interposed between two discs from both sides of the two discs, each of which includes a substrate and a plurality of recording layers, and curing the ultraviolet curable resin such that inversion rates on both surface sides of the ultraviolet curable resin layer becomes equal or substantially equal to each other and become equal to or greater than 70%,
    wherein a thickness of each of the substrates in the two discs is equal to or greater than 0.3 mm and equal to or less than 0.545 mm, and
    wherein transmittance of the two discs is equal to or less than 20%.

10. The manufacturing method of an optical recording medium according to claim 9,
    wherein the irradiation of the ultraviolet curable resin layer with the ultraviolet light is performed in a state in which only inner circumferential portions and outer circumferential portions of a first disc and a second disc are supported and center circumferential portions are not supported and are in a non-contact state.

11. The manufacturing method of an optical recording medium according to claim 9, further comprising:
    interposing the ultraviolet curable resin layer between the two discs by extending ultraviolet curable resin disposed between the two discs.

12. The manufacturing method of an optical recording medium according to claim 11, further comprising:
    irradiating, with the ultraviolet light, the ultraviolet curable resin, which is extended to the outer circumferential portions of the two discs, while the ultraviolet curable resin is extended.

* * * * *